Dec. 3, 1929.  E. C. ORR  1,738,149
INSERTED SAW TOOTH
Filed Feb. 25, 1927

Inventor
Elijah C. Orr
By H.L. & C.L. Reynolds
Attorneys

Patented Dec. 3, 1929

1,738,149

UNITED STATES PATENT OFFICE

ELIJAH C. ORR, OF SEATTLE, WASHINGTON, ASSIGNOR TO ORR SAW TOOTH GRINDER CO., OF SEATTLE, WASHINGTON, A CORPORATION OF WASHINGTON

INSERTED SAW TOOTH

Application filed February 25, 1927. Serial No. 170,817.

My invention relates to insertable saw teeth and the means employed to secure them in the saw. It consists of certain improvements in construction designed to secure a better product and one which is more conveniently put in place and removed from the saw.

An object of the invention is to provide means whereby the tooth is mounted in or upon the holding center so that said center and the tooth may be assembled as a unit before insertion in the receiving recess of the saw.

Another object of my invention is to provide more effective means of clamping and holding the saw teeth when in place.

In the accompanying drawings I have shown samples of insertable saw teeth made in accordance with my invention.

Figure 1:
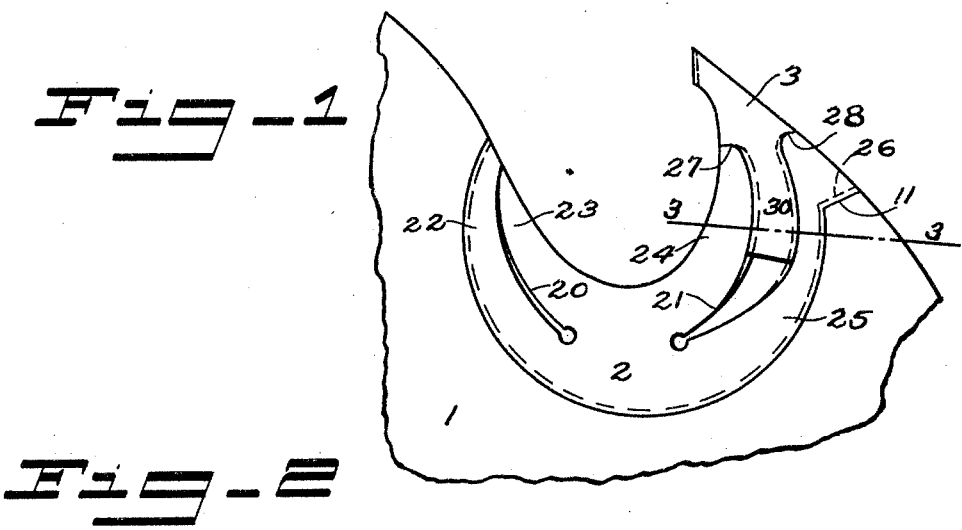
Figure 1 is a side face view of an insertable tooth in place in a saw body.

In the drawings, 1 represents a portion of a saw body having circular recesses formed in its edge for the reception and holding of insertable teeth, of which only sufficient to include one such recess has been shown. The construction of such recesses is, or may be, of any type found suitable for use with my invention. Such recesses usually comprise a major section having a circular or arcuate form as the section 10 and an abutment or thrust section, as 11. The circular or arcuate section 10 should be of rather more than 180° extent.

Figure 2:
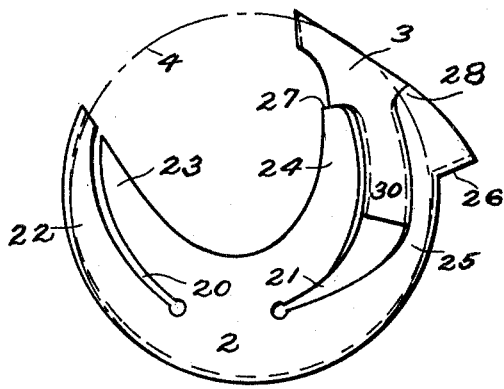
Figure 2 shows the same tooth with its holding member assembled as a unit, but removed from the saw.

In such recess is placed an arcuate or crescent-shaped tooth holding member 2, and the tooth 3. My invention follows these general lines, but varies in the construction of these parts. The crescent-shaped tooth holding member 2 is made with its external, or convex edge, of a slightly greater circle than that of the recess in which it is to be placed, and is so constructed as to provide for such resilient action as is necessary to put it in place. In Figure 2, the broken line circle 4 indicates approximately the relative size and position of the recess into which the tooth assembly is placed. The differences of diameter between the two have been somewhat exaggerated to better bring out their relation.

The tooth holding member 2 has each end slotted to form two fingers. The slot 20 in one end forms two fingers 22 and 23, while the slot 21 in the other end forms two fingers 24 and 25. The outer end of slot 21 is enlarged and shaped to receive and hold the tooth 3.

The finger 22 is designed to have sufficient resiliency that it will yield inwardly when the part 2 is inserted in the recess in the saw body. It is designed that when inserted in place, the inner edge of the outer end of finger 22 will contact with the outer end of finger 23, the latter functioning as a thrust or abutment member to support the finger 22.

The outer finger 25 at the other end of the tooth holding member 2 has an abutment projection 26 which engages a complemental abutment 11 of the saw body to support the backward thrust of the tooth when cutting and to limit the turning action of holder 2 when put in place. For similar reasons, complemental thrust, or abutment surfaces, are provided at 28 between the end of finger 25 and the tooth 3.

Figure 4:
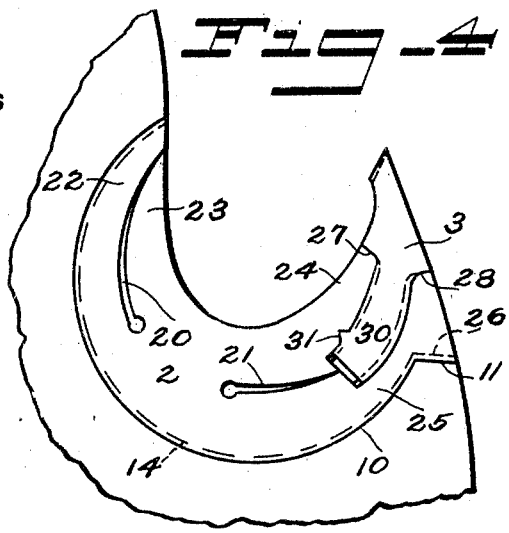
Figure 4 is a side face view of a tooth mounted in the saw body, in which certain modifications of structure are employed.

The outline of the slot 21 is shown differently in Figures 2 and 4. There is nothing vital in such differences.

Figure 3:
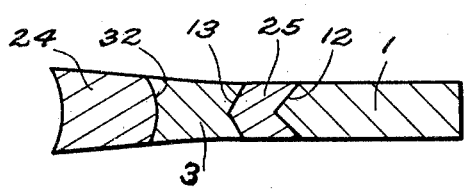
Figure 3 is a section on the line 3—3 of Figure 1.

The tooth 3 has a shank 30 which enters between the fingers 24 and 25 and is securely clamped between them when the outer finger is forced inwardly, as occurs when the holding member 2 is put in place in the recess 10. The head of the tooth has abutments complemental to those at the ends of fingers 24 and 25. The side edges of the tooth shank 30 and the engaging edges of fingers 24 and 25, and, as well, the engaging edge surfaces of the holder 2 and of the saw body 1, are provided with complemental ridge and channel shapes, such for instance as illustrated at 12, 13 and 15 in Figure 3, and at 14 in Figure 4. This is, or may be, of any suitable construction. It is, however, not in and of itself a novel feature.

Preferably, the shank 30 of the tooth is made of slightly greater width towards its inner end, as has been indicated in Figure 2, so that the springing inwardly of the outer end of finger 25, when placed in the recess 10, will cause the finger to seat securely thereon and the tooth will thus be more positively held against removal.

For the same reason, the construction illustrated in Figure 4 has been used. This adds to the construction of Figure 2, complemental projection or tooth and socket or recess, as at 31, which forms a positive lock against withdrawal. The exact means to be employed to secure such positive lock may be varied. Two forms of interlocking against side movements are shown at 12, 13 and at 32 in Figure 3. Any effective construction for this purpose may be employed.

The constructions illustrated make it possible to assemble the tooth and its holder before insertion in the saw, which is a matter of considerable convenience. When the tooth shank is clamped between the holder and the saw itself, there are two pieces which must be placed and held in proper relation when inserting in the saw. By assembling these two parts before insertion, there is only one body to place and control when inserting in the saw. As this work must often be done upon a mounted saw, the conditions are apt to be difficult and dropping of a tooth is apt to lose it, as there is usually much sawdust about. The special locking features employed hold the tooth more securely.

What I claim as my invention is:

1. A tooth holding body for inserted saw teeth having a crescent-like outline with each end of the crescent slotted to make an inner and an outer finger, said slot at one end being of a size to receive a tooth shank, both of said outer fingers having resiliency permitting inward yielding when inserted in the saw to thereby grip the tooth shank at one end and to close the slot space at the other end.

2. A detachable tooth construction for saws, comprising a saw body containing tooth holding recesses having edge walls of circular character, a crescent-shaped tooth holding body fitting in each of said recesses and slotted at each end, the slot in one end being adapted for the reception of a tooth shank, a tooth having a shank fitting said slot, the convex outline of said crescent-shaped holding body being of greater radius than that of the receiving recess in the saw body, whereby when inserted in said recess the outer arms of the slotted ends are thereby pressed inwards to at one end engage the inner arm to therethrough transmit a thrust to the inner face of the tooth shank held in the slot of the other end.

3. An inserted saw tooth device comprising a tooth holder of crescent shape having a tooth receiving slot in one end, and a tooth having a shank adapted to be held in said slot, the tooth holding end of the tooth holder having two thrust shoulders one for engagement with the saw body and the other with the tooth, said shoulders being positioned in the line of thrust of the tooth and at opposite sides of the outermost arm.

4. A holder for an insered tooth in a saw comprising a crescent shaped body provided at one end with means for holding a saw tooth and being slotted at its other end, said slot at its outer end terminating in the inside face of the crescent and being curved to produce thrust abutment faces adapted to or engaged to effectively resist the thrust when the arm which is outward of said slot is sprung inward by insertion in the tooth holding recess of the saw.

5. A tooth holder for inserted teeth saws comprising a crescent shaped body adapted to fit into the recesses in the saw body and having in one arm a slot, opening at the end of the arm and adapted to receive a tooth shank, said slot having an extension inwardly beyond the shank receiving section thereof to provide resiliency for the sides of the slot, the opposite end of the crescent being slotted with the outer end of the slot opening at the inner face of the crescent and providing abutment faces engageable when the holder is seated in its holding recess of the saw to enable the inner branch of this arm to act as a thrust abutment.

6. In an inserted tooth saw, in combination, a saw having circularly arcuate tooth-receiving recesses terminating at one margin in an abutment positioned to resist the thrust produced by the cutting action of the tooth, a tooth holder of crescent shape fitting said recess and having a terminal abutment complementary to that of the saw, the same end of the tooth holder being slotted to receive the shank of a tooth having a shank fitting said slot in the holder, said tooth and the tips of the holder having engaging thrust abutments, the end of the tooth holder opposite to that which receives the tooth being slotted and with the outer arm formed by said slot being resilient and adapted to yield to positively engage the end of the inner arm when the holder is seated in its recess.

Signed at Seattle, King County, Washington, this 29th day of December, 1926.

ELIJAH C. ORR.